United States Patent [19]
Reeves et al.

[11] Patent Number: 5,338,933
[45] Date of Patent: Aug. 16, 1994

[54] SCANNING OPTICAL SENSOR

[75] Inventors: Robert D. Reeves, Aurora; T. Garry Brown, Toronto, both of Canada

[73] Assignee: Spar Aerospace Limited, Brampton, Canada

[21] Appl. No.: 12,413

[22] Filed: Feb. 2, 1993

[51] Int. Cl.⁵ ............................................. G02B 26/10
[52] U.S. Cl. .................... 250/334; 250/236; 359/221
[58] Field of Search ............... 250/334, 332, 397, 235, 250/236; 359/212, 221, 224

[56] References Cited

U.S. PATENT DOCUMENTS

| | | | |
|---|---|---|---|
| 3,219,822 | 11/1965 | Kutzscher et al. | 250/347 |
| 4,767,937 | 8/1988 | Norsworthy | 250/578 |
| 4,999,491 | 3/1991 | Semler et al. | 250/236 |
| 5,001,650 | 3/1991 | Francis et al. | 358/113 |
| 5,149,969 | 9/1992 | Fouilloy et al. | 250/334 |

*Primary Examiner*—Paul M. Dzierzynski
*Assistant Examiner*—Drew A. Dunn

[57] ABSTRACT

A scanning infrared sensor has a continuously rotating head to which is mounted an infrared telescope with a two-dimensional detector array. Blurring of the image output by the detector array is avoided by means of a fast steering mirror positioned on the head at the input of the telescope. The fast steering mirror is rotated in an opposite sense to the sensor head so that the array stares at a region of space for a sufficient time to allow the capture of an unblurred image from the detector array. The mirror then flies back to a starting position and then begins to rotate once more in an opposite sense to the sensor head so that the array stares at a further region of space, and so on.

17 Claims, 4 Drawing Sheets

SCANNING OPTICAL SENSOR

BACKGROUND OF THE INVENTION

Field of the Invention

This invention relates to a scanning optical sensing device and a method for the use of such a device.

Description of the Related Art

Scanning infrared sensors typically employ a continuously rotating linear array of infrared detectors. Several linear arrays may be positioned side-by-side and time delay and integration techniques used to obtain an average signal for any given azimuth angle of the scan. The cost of preparing each linear array is high. Further, malfunction of an element in a linear array degrades the performance of the sensor. Accordingly, there remains a need for a low cost sensor that is less sensitive to detector failure.

SUMMARY OF THE INVENTION

According to the present invention, there is provided a scanning optical sensing device comprising: a rotatable support; an optical two-dimensional imaging device mounted to said support; a mirror rotatably mounted to said support in the optical path of said imaging device; means to continuously rotate said support in a scanning path; means to rotate said mirror so that said detector array momentarily stares at successive regions of space in said scanning path.

According to another aspect of this invention, there is provided a method of optically scanning the horizon and an elevation field comprising the following steps: (a) continuously moving a support for an optical sensor, comprising a two-dimensional imaging device, and a mirror, which is in the optical path of said optical sensor, in a scanning path; (b) repetitively consecutively (i) rotating said mirror from a starting position relative to said support in a retrograde sense to the motion of said support so that said optical sensor stares at a region of space and (ii) rotating said mirror in the same sense as the motion of said support and at a greater speed than the speed of motion of said support so that said mirror flies back to said starting position, whereby the optical input to said optical sensor is maintained at a given region of space while said mirror rotates in a retrograde sense to the motion of said support.

BRIEF DESCRIPTION OF THE DRAWINGS

In the figures which disclose example embodiments of the invention.

DESCRIPTION OF THE PREFERRED EMBODIMENTS

Figure 1:
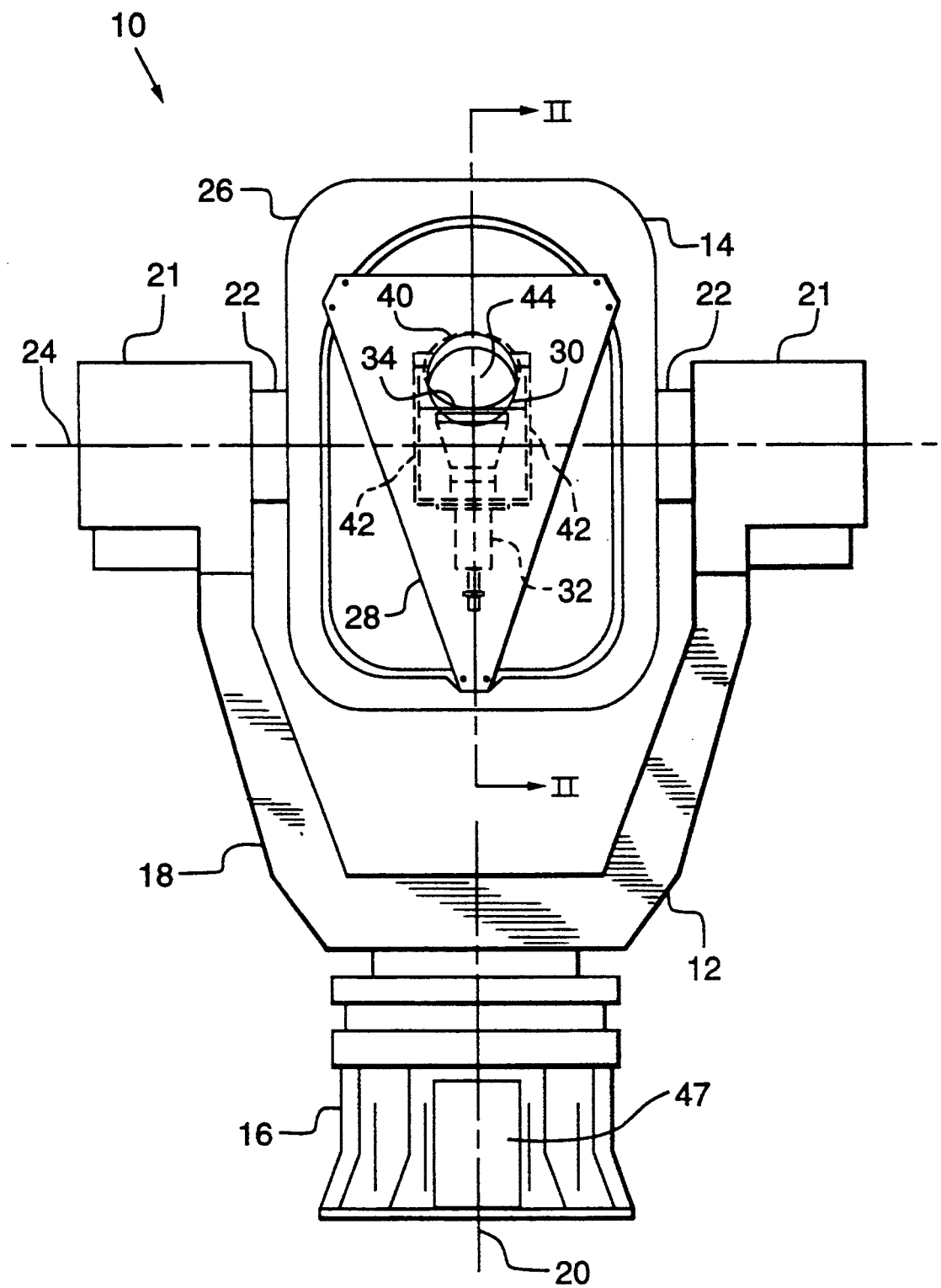
FIG. 1 is a front view of a scanning sensor made in accordance with this invention.

With reference to FIG. 1, a sensor indicated generally at 10 comprises a pedestal 12 having a base 16, a cradle 18 and a support head 14. The cradle 18 is mounted to the base for rotation about axis 20 and the support head 14 is mounted to the output shafts 22 of elevation motors/encoders 21 so that the head is pivotally mounted to the cradle 18 for rotation about axis 24.

Figure 2:
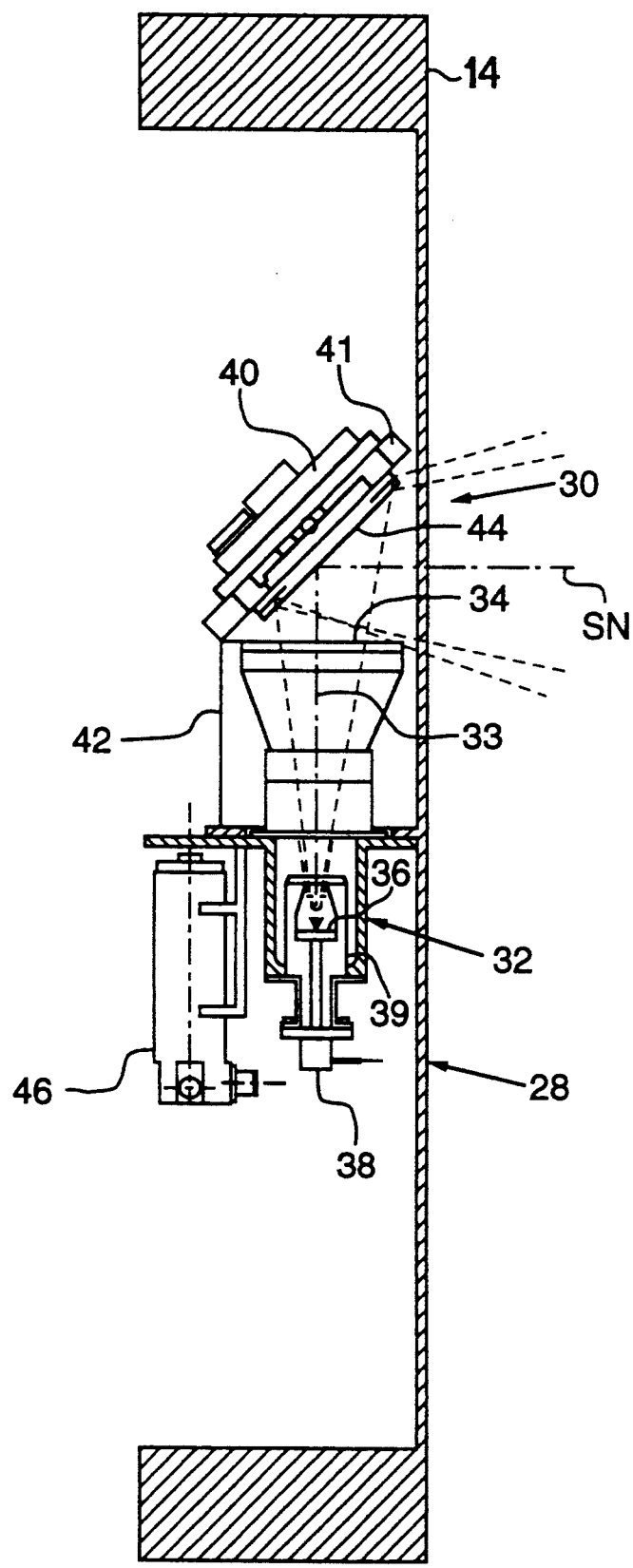
FIG. 2 is a cross-sectional view along the lines II—II of FIG. 1.

With reference to FIG. 2 as well as FIG. 1, the head 14 has an annular frame 26 and a central mounting bracket 28 with a circular aperture 30. An optical sensor comprising infrared (IR) telescope 32 is mounted to bracket 28. The telescope has an input end 34 and a two-dimensional focal plane array (FPA) of IR detectors 36 housed in a Dewar 39 (which is a vacuum bottle) which is cooled by cooler 38. A fast steering mirror assembly (FSM) 40, comprising a body 41 and a mirror 44, is mounted to walls 42 of the mounting bracket at the input end of the telescope 32 in line with the optical path of the telescope which is centred about its optical axis 33. The mirror is also mounted in registration with the circular aperture 30. As will become apparent hereinafter, the fast steering mirror assembly has two degrees of freedom on the mounting bracket 28. It will be noted from FIG. 1 that the mirror assembly 40 and the telescope 32 are mounted on the axis of rotation 20 of the cradle 18, although this is not an essential requirement. A compressor 46 supplies compressed helium gas to the compressor to cool the infrared detectors.

Figure 3:
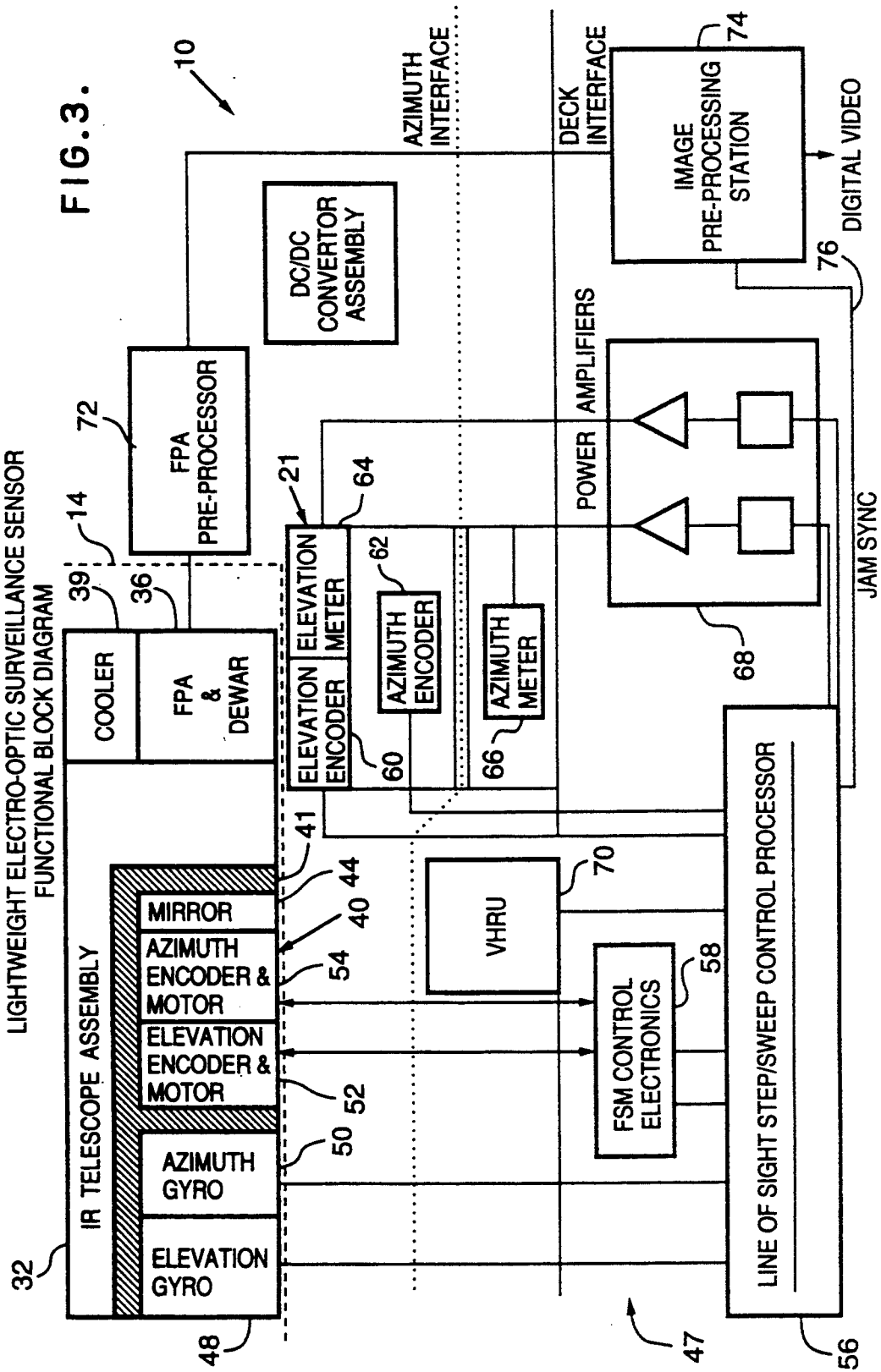
FIG. 3 is a functional unit block diagram of the sensor of FIG. 1, and FIG. 4 are schematic plan views of a scanning sensor made in accordance with this invention illustrating the operation of the invention.

Motors/encoders 21 and electronics (which are seen in FIG. 3 and will be described hereinafter) feed to interface unit 47 of base 16.

Turning to FIG. 3 which is a functional block diagram of sensor 10, the functional blocks for elements shown in FIGS. 1 and 2 are given like reference numerals. The fast steering mirror 40 comprises, in addition to mirror 44, mirror elevation encoder/motor 52, and a mirror azimuth encoder/motor 54. The encoders sense the position and velocity of the mirror relative to the mirror body 41. In FSM's, the encoders are typically magnetic proximity sensors and the motors operate in a manner similar to voice coils. An elevation gyro 48 and an azimuth gyro 50 are mounted on the telescope 32. The output of the gyros 48, 50 feed to a control processor 56; the motors/encoders 52, 54 interface with fast steering mirror control electronics 58. The FSM control electronics are connected for two way communication with control processor 56. The control processor receives an input from head elevation encoder 60 of the encoders/motors 21 and a cradle azimuth encoder 62. The processor outputs to head elevation motor 64 (of the motors/encoders 21) and cradle azimuth motor 66 through power amplifiers 68. The processor is also connected for two-way communication with vertical and heading reference unit (VHRU) 70.

The FPA 36 of the telescope 32 outputs to an FPA pre-processor 72. The pre-processor outputs to an image pre-processing station 74 which outputs a digital video signal. The control processor 56 outputs a jam sync signal on line 76 to the image pre-processing station.

The sensor 10 is adapted for use on the deck of a ship.

In operation, the VHRU 70, as understood by those skilled in the art, indicates true vertical with respect to the deck plane and a true reference azimuth angle (such as true north). This information is passed to processor 56. The relative elevation angle as between head 14 and cradle 18 is provided to the processor 56 from elevation encoder 60 and the relative azimuth angle between cradle 18 and base 16 is provided to the processor from azimuth encoder 62. With the elevation, azimuth, and deck attitude information, the processor controls elevation motors 64 and azimuth motors 66 so that head 14 maintains a desired true elevation angle. The processor rotates the head 14 continuously at a constant azimuth angular velocity in a horizontal frame. This approach allows the processor to continuously and repetitively sweep the head 14 at a constant rate through a preset scanning path irrespective of the pitch, roll and yaw of the deck.

The described approach to control the elevation angle and the changing azimuth angle of head 14 is subject to some tolerance errors. In part to increase the precision of this control at the mirror 44, the elevation gyro 48 and the azimuth gyro 50 indicate a true reference elevation and azimuth angle for the telescope 32 and hence for the body 41 of the FSM 40. The relative elevation and azimuth angle between the mirror 44 and the mirror body 41 is indicated by the encoders of motors/encoders 52, 54. This information is used by the processor 56 to provide a fine control for the elevation angle of the mirror 44 and so that the azimuth angle of the mirror 44 is accurately controlled with respect to a true reference azimuth angle for reasons which will shortly become apparent.

Figure 4:
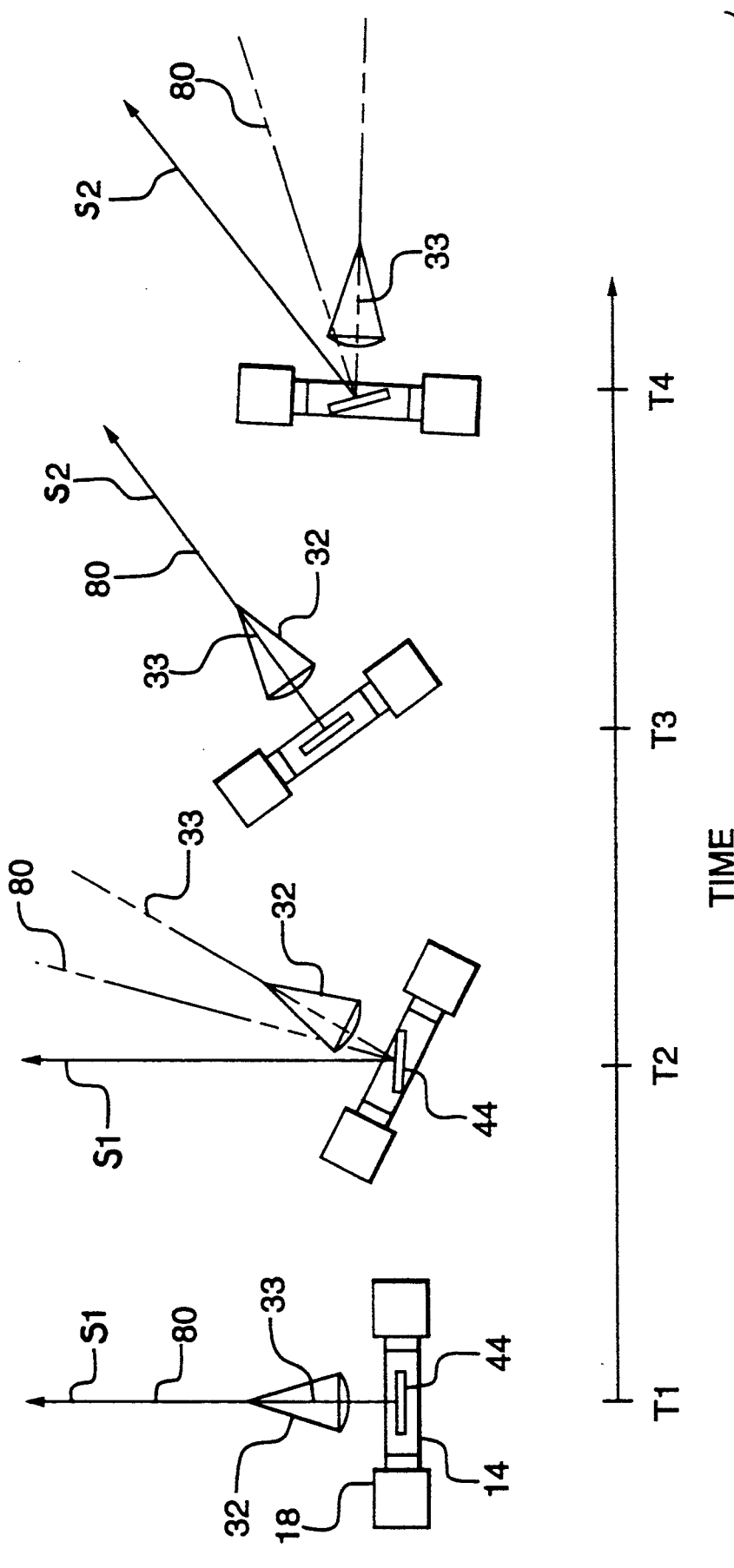

The azimuth and elevation information relating to mirror 44 is used by the processor 56 to cause the mirror to move so that the detector array stares at regions of space in the scanning path, as follows. FIG. 4 is a series of schematic plan views of the device in which, for illustrative purposes, the optical telescope 32 has been rotated somewhat in elevation from its actual position. With reference to FIG. 4, at a time T1, the mirror 44 is oriented at a starting position whereat a normal 80 to the mirror is laterally aligned with the optical axis 33 of the telescope 32 and is laterally aligned with the stare direction S1. Consequently, the mirror receives light in the stare direction and reflects this light (downwardly) to the FPA of the telescope 32. From T1 to T2 the telescope 32 rotates clockwise with the head 14 but the processor rotates the mirror 44 anti-clockwise at half the speed of the head. Accordingly, during this period, the normal 80 to the mirror bisects the lateral angle between the stare direction S1 and the optical axis 33 such that the mirror continues to receive light from the stare direction and reflect it to the FPA throughout this period. This operation continues until just prior to time T3 when the processor rotates the mirror rapidly in a clockwise sense so that the mirror flies back to its starting position at time T3 whereat the normal 80 to the mirror is once more laterally aligned with the optical axis 33 of the telescope. At time T3, the mirror stares in a second direction S2 and reflects this light to the FPA. As the head continues to rotate clockwise from time T3, the mirror is again rotated counterclockwise at half speed so as to cancel out this clockwise motion and continue to reflect light from the stare direction S2 from time T3 to time T4. After time T4 the mirror will again fly back to its starting position and the process will repeat. It will be appreciated that in this way the mirror may be controlled to reflect light to the array from selected regions of space for selected times (up to a maximum time determined by the limit of the freedom of the mirror to rotate in azimuth) in the scanning path traced by the head 14.

FIG. 4 is schematic in nature, in a practical system, the mirror receives light from a region for a very short period of time and the regions at which the mirror receives light are more closely spaced. While the image on the FPA will rotate as the mirror retrogradely rotates to cancel the rotational motion of the head, this effect is small.

As shown in FIG. 2, the optical axis 33 is offset in elevation 90 degrees from the staring direction SN and the normal to the mirror 44 is controlled to maintain an offset in elevation which is 45 degrees from the staring direction SN. In this way the mirror always reflects received light downwardly to the FPA. Some offset in elevation is necessary so that the telescope does not block reception by the mirror in the staring direction.

It should be noted that the mirror and telescope may be mounted in other locations so long as the mirror normal bisects the angle between the telescope optical axis and individual stare directions throughout the stare period.

In a practical system, with 64 to 340 columns of detectors the array may cover up to 20 degrees in azimuth; consequently, the regions stared at by the array may be up to 20 degrees apart. A practical system may also have 64 to 240 rows of detectors and cover up to 15 degrees in elevation.

A two-dimensional array of IR detectors has the drawback that if, while activated, it receives a constantly changing input, the output is blurred. Accordingly, the optical line of sight for the array must be held stationary in inertial space during a period sufficient for the array to integrate photons and form an image; the lower limit for this period is set by the performance of the array under the conditions of use, and the upper limit is set by the lower of (1) the maximum time period that the FSM can provide a stationary line of sight, and (2) the maximum time period the array can use (under certain circumstances the array can be "overexposed", or saturated, by too much light). The limits, therefore, are dependent upon the specific application of the retrograde scan technique. Thus, if the array, once activated (triggered), must receive a stationary image for, say, 3 ms to avoid blurring, then the mirror must maintain the optical line of sight for at least slightly longer than this period so that the image from the array is not blurred. Typically, an array, when triggered, remains active for only a short period of time. This period may be as short as the 1 ms minimum time to form an image, however, a better image is obtained with a longer active period. Further, the mirror may be caused to maintain the line of sight at a region of space for a sufficient time so that the array may be triggered to provide several images of the region. Each image received by the FPA is called a frame.

Once an image is formed at the FPA it may be read out to the pre-processor 72 whereupon the FPA is freed up to receive a new image. The output from the FPA passes from the pre-processor 72 to the image pre-processing station 74. The FPA is triggered by means of a jam sync signal from the processor 56 to station 74 on line 76. Accordingly, once the mirror begins to hold an optical line of sight at a region of space, the processor may send a jam sync signal to station 74 to trigger the array and cause the resulting image from the FPA to be processed by the station 74. Where the duration of the time of staring at a region of space is pre-selected to allow the capture of a number of frames, the processor will send a series of jam sync signals to the station 74 to initiate each of these frames. The processor refrains from sending a jam sync signal while the mirror 44 flies back in preparation to hold a line of sight at a subsequent region of space. Once the mirror begins to hold the line of sight at this subsequent region, the FPA and station 74 may again be triggered and scanning proceeds in this way. The processed frames are output from the station 74 as digital video signals.

The Dewar and cooler ensure the FPA is kept cool which is a requirement for IR detectors in the current state of the technology.

A two-dimensional array provides a number of advantages over a linear array of detectors. Firstly, a two-dimensional array is much cheaper to fabricate than a linear array primarily because of the requirement with a linear array to carefully cut each array from a wafer. Secondly, a two-dimensional array provides an output which is similar to a standard video output signal so that commercially available image processing technology may be used in the system. Thirdly, a linear array cannot tolerate even a single dead detector whereas simple scanning techniques permit a two-dimensional array to tolerate dead spots in the array. One such technique is to choose the angular width of each region stared at so that the regions do not integrally divide by 360 degrees. In this way the regions are overlapped on consecutive scans. Another technique is to superimpose a small dither on the mirror as it stares at a region of space.

The embodiment shown uses a two axis steered mirror and a two axis pedestal (i.e., with reference to FIG. 1, the base 16 supporting cradle 18 for rotation provides one axis and the cradle supporting head 14 for rotation provides a second axis). An alternative arrangement would be to use a single axis steered mirror together with a three axis pedestal (azimuth over pitch over roll or cross-roll over elevation over azimuth). A single axis steered mirror uses galvanometer movements to torque the mirror. With this implementation, the axis of rotation of the mirror would have to be maintained in a vertical position.

If the pedestal 12 is highly accurate, then the elevation and azimuth gyros 48, 50 may be unnecessary. If the sensor 10 is to be used at a non-mobile land base then not only may the elevation and azimuth gyros be unnecessary but also the pedestal 12 may set the desired elevation angle of the mirror 44 so that there is no need for elevation encoder and motor 52 in the FSM 40. Further, there will likely be no need for a vertical reference signal from VHRU 70.

While the scanning path for the sensor will typically be through 360 degrees of azimuth at a constant elevation angle, other scanning paths may be chosen for the sensor.

While this scanning sensing device has been described as an infrared scanner, the invention will have application to any surveillance sensor which has a two-dimensional imaging device. These devices have a frame time (i.e., the minimum time for one image to be captured without blurring) of the order of milliseconds. For example, the invention would have application to a surveillance TV camera to allow it to scan at a higher rate than they would otherwise be able to do so as their frame rate is usually limited to 30 Hz.

Other modifications will be apparent to those skilled in the art and, accordingly, the invention is defined in the claims.

What is claimed is:

1. A scanning optical sensing device comprising:
   a rotatable support;
   an optical two-dimensional imaging device mounted to said support;
   a mirror rotatably mounted to said support in the optical path of said imaging device;
   means to continuously rotate said support in a scanning path;
   means to rotate said mirror so that said detector array momentarily stares at successive regions of space in said scanning path.

2. The sensing device of claim 1 wherein said optical imaging device is fixedly mounted to said support.

3. The sensing device of claim 2 wherein said means to rotate said mirror may rotate said mirror from a starting position in a first sense for causing said optical imaging device to stare at a region of space while the support continuously rotates and may rotate said mirror in a second sense so that said mirror flies back to said starting position.

4. The sensing device of claim 3 wherein said mirror and said means to rotate said mirror are mounted within a mirror body and wherein said means to continuously rotate said support comprises a cradle mounted for rotation in azimuth about an axis.

5. The sensing device of claim 4 wherein said support is mounted to said cradle for rotation in elevation about an axis and wherein said means to continuously rotate said support in a scanning path rotates said cradle, and therefore said support, in azimuth while said support is maintained at a selected elevation.

6. The sensing device of claim 5 wherein said mirror body is mounted on said head such that said mirror is at the axis of said cradle.

7. The sensing device of claim 6 wherein said mirror is mounted within said mirror body so as to have two degrees of rotational freedom.

8. The sensing device of claim 4 wherein said mirror is mounted within said mirror body so as to have one degree of rotational freedom about a mirror axis and wherein said support is mounted to said cradle so as to have two degrees of rotational freedom in order to be able to maintain said mirror axis vertically oriented.

9. The sensing device of claim 4 wherein said detector array comprises a two-dimensional focal plane array of infrared detectors.

10. A scanning optical sensing device comprising:
    a support rotatable about an axis;
    an optical sensor comprising a two-dimensional imaging device fixedly mounted to said support;
    a mirror rotatably mounted to said support in the optical path of said sensor and on the axis of rotation of said support;
    means to continuously rotate said support in a scanning path;
    means to repetitively consecutively (i) rotate said mirror from a starting position in a retrograde sense to the rotational sense of said support so that said optical sensor stares at a region of space and (ii) rotate said mirror in the same sense and at a greater angular speed than said support so that said mirror flies back to said starting position.

11. The sensing device of claim 10 wherein said rotation means for said support includes means to maintain said support at a preset elevation angle while continuously rotating said support in a sense to provide a constantly changing azimuth angle.

12. The sensing device of claim 11 wherein said means to continuously rotate said support comprises a cradle mounted for rotation in azimuth about an axis.

13. The sensing device of claim 12 wherein said mirror is mounted to said support so as to have two degrees of rotational freedom.

14. The sensing device of claim 12 wherein said optical sensor is a two-dimensional focal plane array of infrared detectors.

15. A method of optically scanning the horizon and an elevation field comprising the following steps:
   (a) continuously moving a support for an optical sensor, comprising a two-dimensional imaging device, and a mirror, which is in the optical path of said optical sensor, in a scanning path;
   (b) repetitively consecutively (i) rotating said mirror from a starting position relative to said support in a retrograde sense to the motion of said support so that said optical sensor stares at a region of space and (ii) rotating said mirror in the same sense as the motion of said support and at a greater speed than the speed of motion of said support so that said mirror flies back to said starting position, whereby the optical input to said optical sensor is maintained at a given region of space while said mirror rotates in a retrograde sense to the motion of said support.

16. The method of optically scanning the horizon of claim 15 wherein said step of continuously rotating said support in a scanning path comprises maintaining said support at a preset elevation angle while continuously rotating said support in a sense to provide a changing azimuth angle.

17. The method of claim 15 wherein step (b) (i) comprises rotating said mirror such that a normal to said mirror bisects the angle between an optical axis of said optical sensor and said stare direction.

* * * * *